US012614178B2

(12) United States Patent (10) Patent No.: US 12,614,178 B2
Zhu et al. (45) Date of Patent: Apr. 28, 2026

(54) RESOURCE TRANSFER METHODS, APPARATUSES, AND DEVICES

(71) Applicant: ALIPAY (HANGZHOU) INFORMATION TECHNOLOGY CO., LTD., Hangzhou (CN)

(72) Inventors: Bingying Zhu, Hangzhou (CN); Jun Wen, Hangzhou (CN); Fuping Yu, Hangzhou (CN); Zhi Xin, Hangzhou (CN); Xiaofei Wan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/399,393

(22) Filed: Dec. 28, 2023

(65) Prior Publication Data

US 2024/0127250 A1 Apr. 18, 2024

Related U.S. Application Data

(63) Continuation of application No. PCT/CN2022/106361, filed on Jul. 19, 2022.

(30) Foreign Application Priority Data

Sep. 17, 2021 (CN) ......................... 202111091686.6

(51) Int. Cl.
G06Q 20/40 (2012.01)
G06F 21/60 (2013.01)
G06Q 20/38 (2012.01)
(52) U.S. Cl.
CPC ..... G06Q 20/40145 (2013.01); G06F 21/602 (2013.01); G06Q 20/3829 (2013.01); G06Q 20/4016 (2013.01); G06Q 2220/00 (2013.01)

(58) Field of Classification Search
None
See application file for complete search history.

(56) References Cited

U.S. PATENT DOCUMENTS

2016/0191492 A1 6/2016 Shang et al.
2016/0224973 A1* 8/2016 Van Os .............. G06Q 20/3224
(Continued)

FOREIGN PATENT DOCUMENTS

CN 105550877 5/2016
CN 107679861 2/2018
(Continued)

OTHER PUBLICATIONS

Extended European Search Report in European Appln. No. 22868828. 9, mailed on Aug. 19, 2024, 10 pages.
(Continued)

*Primary Examiner* — Jamie R Kucab
(74) *Attorney, Agent, or Firm* — Fish & Richardson P.C.

(57) ABSTRACT

A resource transfer method includes obtaining, by using a target application, a resource transfer request triggered by a target user, where the resource transfer request includes verification information used to perform resource transfer processing and identity feature information of the target user. By using the target application, verifying the verification information, and invoking, if the verification succeeds by using the target application, a local device management rule, and determining, by using the local device management rule, whether the identity feature information of the target user matches identity feature information of a pre-registered user. If the identity feature information of the target user matches the identity feature information of the pre-registered user, sending the resource transfer request to a first server corresponding to the target application to trigger, (Continued)

based on the resource transfer request, the first server to perform resource transfer processing.

18 Claims, 9 Drawing Sheets

(56) References Cited

U.S. PATENT DOCUMENTS

| | | | | |
|---|---|---|---|---|
| 2017/0061441 A1* | 3/2017 | Kamal | ................. | G06Q 20/326 |
| 2019/0354980 A1 | 11/2019 | Li et al. | | |
| 2020/0065822 A1* | 2/2020 | Lin | .................... | G06Q 20/4016 |
| 2023/0388127 A1* | 11/2023 | Chang | ................... | H04L 9/0894 |
| 2024/0257141 A1* | 8/2024 | Khan | ................. | G06Q 20/3829 |

FOREIGN PATENT DOCUMENTS

| | | |
|---|---|---|
| CN | 108022102 | 5/2018 |
| CN | 110414200 | 11/2019 |
| CN | 110472980 | 11/2019 |
| CN | 110491044 | 11/2019 |
| CN | 110555706 A | 12/2019 |
| CN | 111311251 | 6/2020 |
| CN | 111917799 | 11/2020 |
| CN | 113177850 | 7/2021 |
| CN | 113807856 | 12/2021 |
| WO | WO 2023/040451 | 3/2023 |

OTHER PUBLICATIONS

International Preliminary Report on Patentability in International Appln. No. PCT/CN2022/106361, mailed on Mar. 28, 2024, 12 pages (with English translation).

International Search Report and Written Opinion in International Appln. No. PCT/CN2022/106361, mailed on Sep. 27, 2022, 16 pages (with English translation).

* cited by examiner

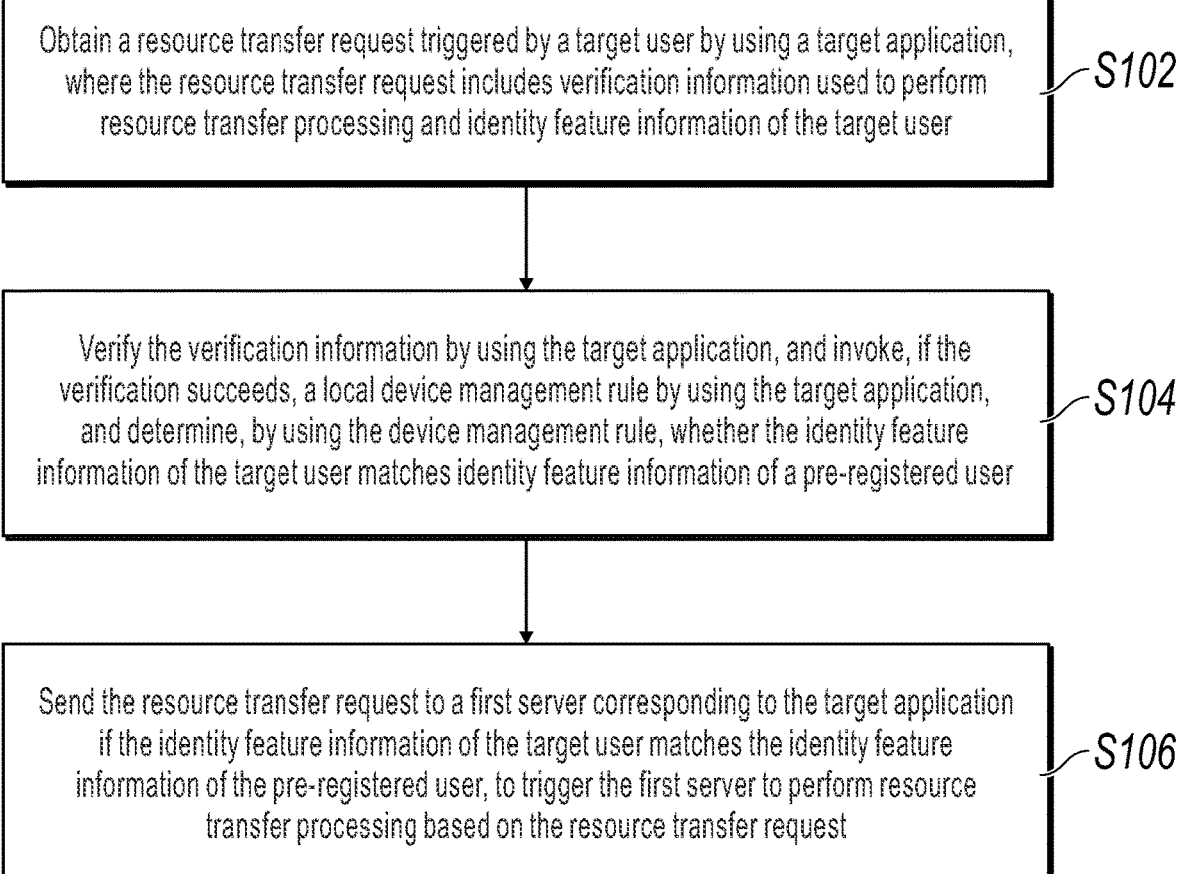

Obtain a resource transfer request triggered by a target user by using a target application, where the resource transfer request includes verification information used to perform resource transfer processing and identity feature information of the target user ⎬—S102

Verify the verification information by using the target application, and invoke, if the verification succeeds, a local device management rule by using the target application, and determine, by using the device management rule, whether the identity feature information of the target user matches identity feature information of a pre-registered user ⎬—S104

Send the resource transfer request to a first server corresponding to the target application if the identity feature information of the target user matches the identity feature information of the pre-registered user, to trigger the first server to perform resource transfer processing based on the resource transfer request ⎬—S106

FIG. 1

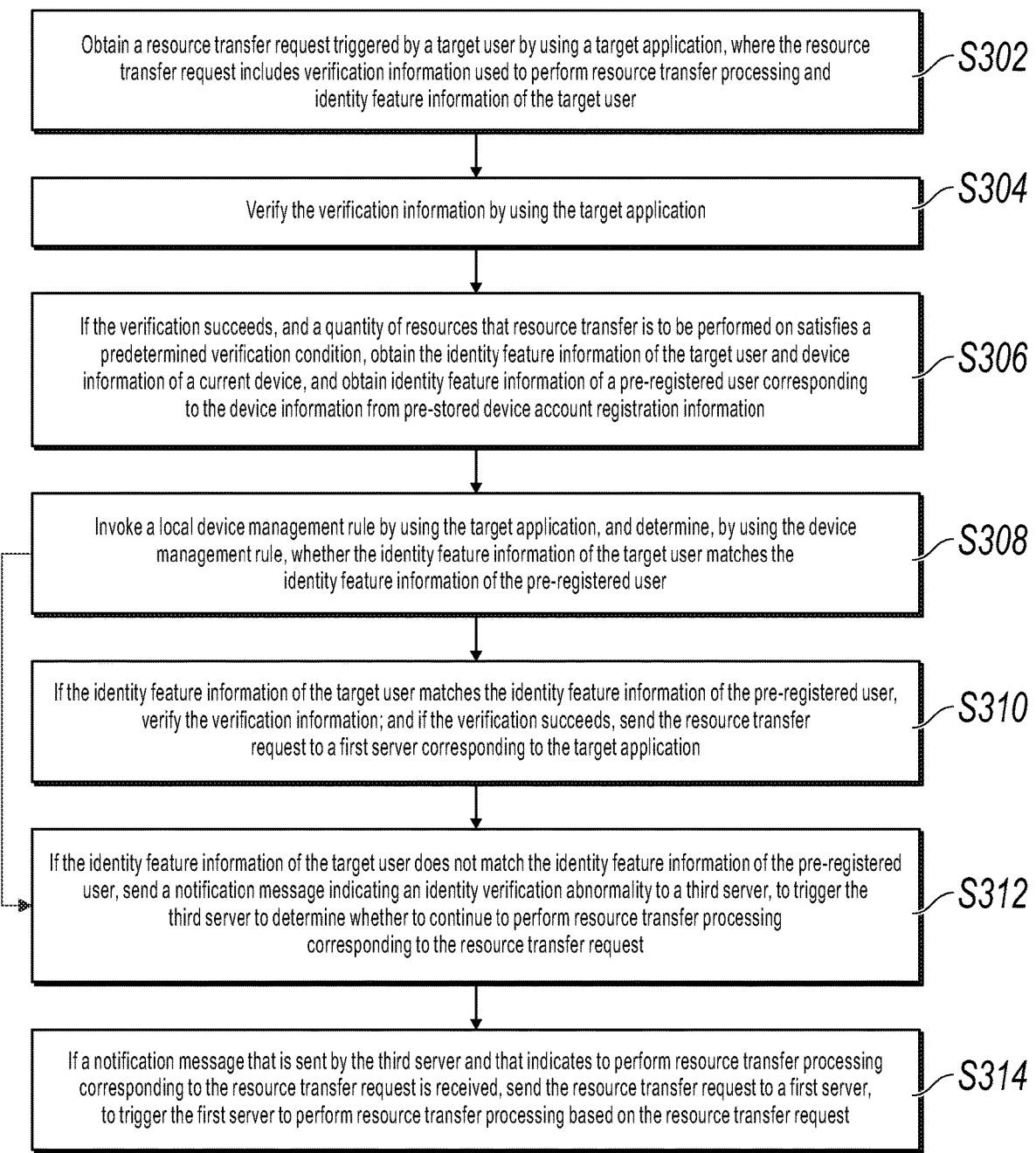

Obtain a resource transfer request triggered by a target user by using a target application, where the resource transfer request includes verification information used to perform resource transfer processing and identity feature information of the target user ⟋S302

Verify the verification information by using the target application ⟋S304

If the verification succeeds, and a quantity of resources that resource transfer is to be performed on satisfies a predetermined verification condition, obtain the identity feature information of the target user and device information of a current device, and obtain identity feature information of a pre-registered user corresponding to the device information from pre-stored device account registration information ⟋S306

Invoke a local device management rule by using the target application, and determine, by using the device management rule, whether the identity feature information of the target user matches the identity feature information of the pre-registered user ⟋S308

If the identity feature information of the target user matches the identity feature information of the pre-registered user, verify the verification information; and if the verification succeeds, send the resource transfer request to a first server corresponding to the target application ⟋S310

If the identity feature information of the target user does not match the identity feature information of the pre-registered user, send a notification message indicating an identity verification abnormality to a third server, to trigger the third server to determine whether to continue to perform resource transfer processing corresponding to the resource transfer request ⟋S312

If a notification message that is sent by the third server and that indicates to perform resource transfer processing corresponding to the resource transfer request is received, send the resource transfer request to a first server, to trigger the first server to perform resource transfer processing based on the resource transfer request ⟋S314

FIG. 3

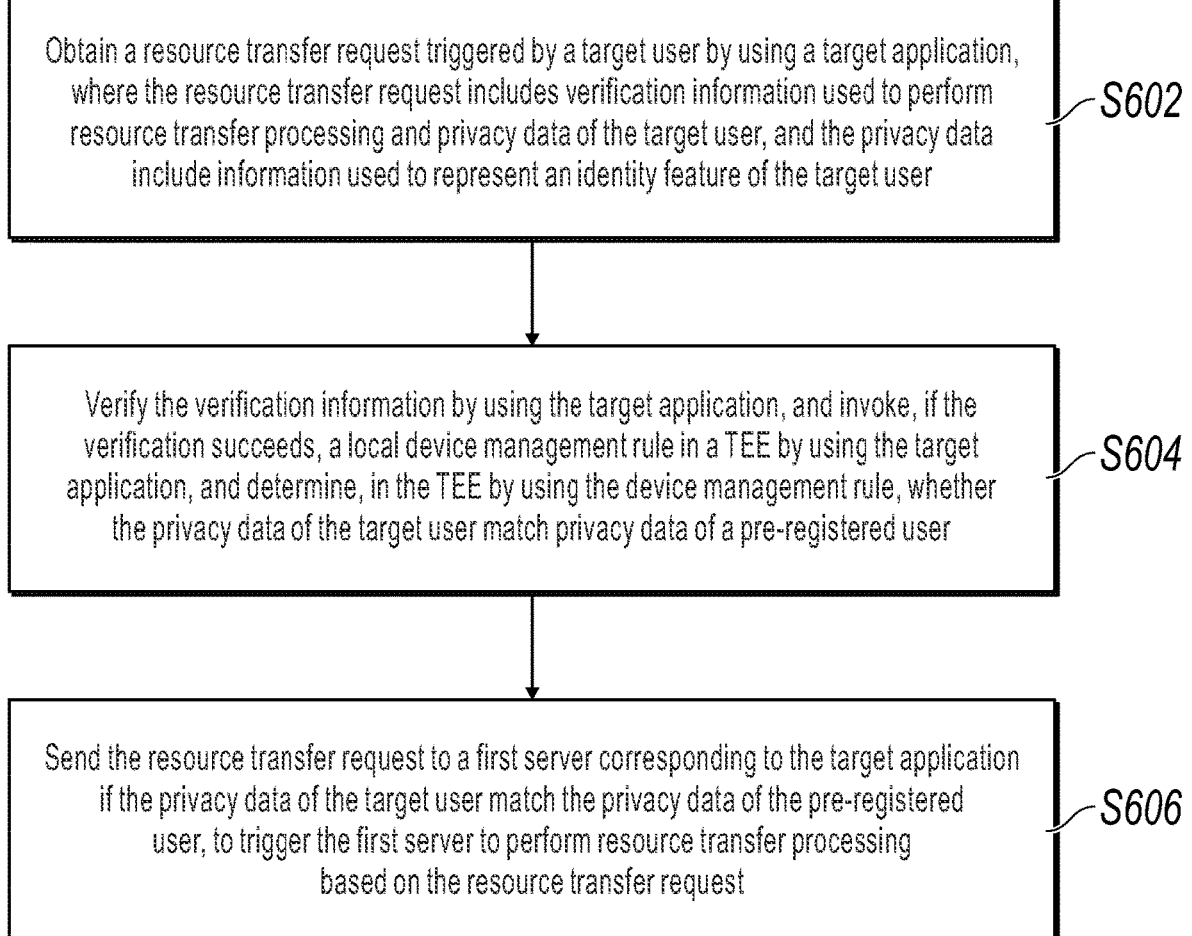

Obtain a resource transfer request triggered by a target user by using a target application, where the resource transfer request includes verification information used to perform resource transfer processing and privacy data of the target user, and the privacy data include information used to represent an identity feature of the target user ⟋S602

Verify the verification information by using the target application, and invoke, if the verification succeeds, a local device management rule in a TEE by using the target application, and determine, in the TEE by using the device management rule, whether the privacy data of the target user match privacy data of a pre-registered user ⟋S604

Send the resource transfer request to a first server corresponding to the target application if the privacy data of the target user match the privacy data of the pre-registered user, to trigger the first server to perform resource transfer processing based on the resource transfer request ⟋S606

FIG. 6

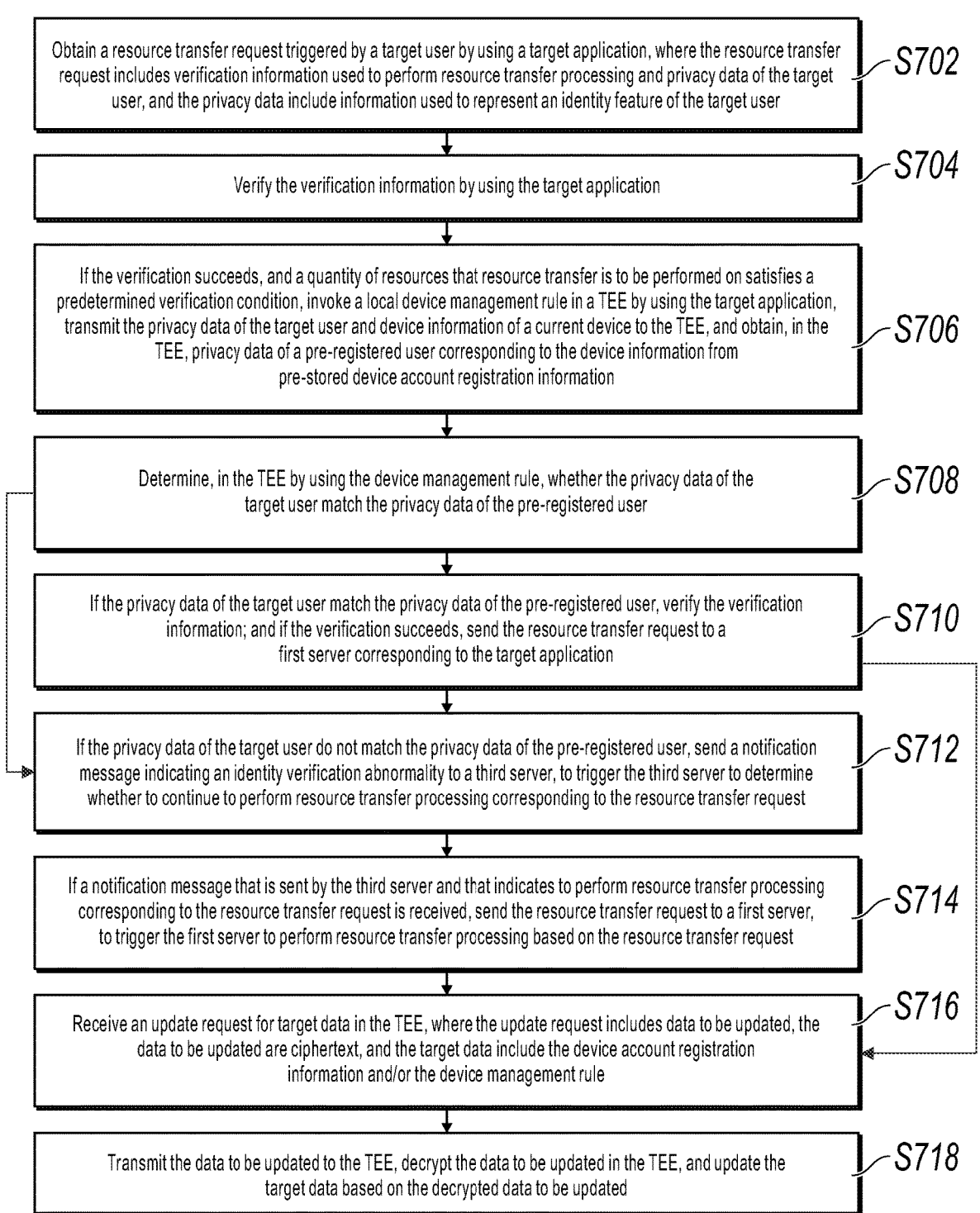

Obtain a resource transfer request triggered by a target user by using a target application, where the resource transfer request includes verification information used to perform resource transfer processing and privacy data of the target user, and the privacy data include information used to represent an identity feature of the target user — S702

Verify the verification information by using the target application — S704

If the verification succeeds, and a quantity of resources that resource transfer is to be performed on satisfies a predetermined verification condition, invoke a local device management rule in a TEE by using the target application, transmit the privacy data of the target user and device information of a current device to the TEE, and obtain, in the TEE, privacy data of a pre-registered user corresponding to the device information from pre-stored device account registration information — S706

Determine, in the TEE by using the device management rule, whether the privacy data of the target user match the privacy data of the pre-registered user — S708

If the privacy data of the target user match the privacy data of the pre-registered user, verify the verification information; and if the verification succeeds, send the resource transfer request to a first server corresponding to the target application — S710

If the privacy data of the target user do not match the privacy data of the pre-registered user, send a notification message indicating an identity verification abnormality to a third server, to trigger the third server to determine whether to continue to perform resource transfer processing corresponding to the resource transfer request — S712

If a notification message that is sent by the third server and that indicates to perform resource transfer processing corresponding to the resource transfer request is received, send the resource transfer request to a first server, to trigger the first server to perform resource transfer processing based on the resource transfer request — S714

Receive an update request for target data in the TEE, where the update request includes data to be updated, the data to be updated are ciphertext, and the target data include the device account registration information and/or the device management rule — S716

Transmit the data to be updated to the TEE, decrypt the data to be updated in the TEE, and update the target data based on the decrypted data to be updated — S718

RESOURCE TRANSFER METHODS, APPARATUSES, AND DEVICES

CROSS-REFERENCE TO RELATED APPLICATIONS

This application is a continuation of PCT Application No. PCT/CN2022/106361, filed on Jul. 19, 2022, which claims priority to Chinese Application No. 202111091686.6, filed Sep. 17, 2021, all of which are hereby incorporated by reference in their entireties.

TECHNICAL FIELD

This specification relates to the field of computer technologies, and in particular, to resource transfer methods, apparatuses, and devices.

BACKGROUND

With the continuous development of Internet and terminal technologies, people are increasingly dependent on terminal devices in their work and life. People use the terminal device to store important personal information, and can use the terminal device to process various important services (such as a financial service or an instant messaging service). If the terminal device is lost or stolen, problems are caused to the user.

Currently, applications of some important services often verifies a predetermined corresponding password, fingerprint feature information, facial feature information, etc. to verify validity of initiating a current service. However, if information such as the predetermined payment password is leaked, it poses a significant security threat to resources (such as assets) of the user. That is, when the user's terminal device and the information such as the predetermined payment password are obtained by a thief, the thief can steal resources in an account of the user, for example, can perform operations such as transfer, malicious consumption, and money laundering on the resources in the account of the user. As a result, when the terminal device is lost or stolen, the user is exposed to a risk such as theft of huge data and financial assets. Therefore, a solution to a problem that resources of a user are stolen when information such as a terminal device of the user is lost and predetermined verification information is also stolen needs to be provided.

SUMMARY

An objective of embodiments of the specification is to provide a solution to a problem that resources of a user are stolen when a terminal device of the user is lost and predetermined verification information is also stolen.

To implement the above-mentioned technical solutions, the embodiments of this specification are implemented as follows: Embodiments of this specification provide a resource transfer method, where the method includes: obtaining a resource transfer request triggered by a target user by using a target application, where the resource transfer request includes verification information used to perform resource transfer processing and identity feature information of the target user; verifying the verification information by using the target application, and invoking, if the verification succeeds, a local device management rule by using the target application, and determining, by using the device management rule, whether the identity feature information of the target user matches identity feature information of a pre-registered user; and sending the resource transfer request to a first server corresponding to the target application if the identity feature information of the target user matches the identity feature information of the pre-registered user, to trigger the first server to perform resource transfer processing based on the resource transfer request.

Embodiments of this specification provide a privacy protection-based resource transfer method, applied to a terminal device, where a trusted execution environment (TEE) is set in the terminal device, and the method includes: obtaining a resource transfer request triggered by a target user by using a target application, where the resource transfer request includes verification information used to perform resource transfer processing and privacy data of the target user, and the privacy data include information used to represent an identity feature of the target user; verifying the verification information by using the target application, and invoking, if the verification succeeds, a local device management rule in the TEE by using the target application, and determining, in the TEE by using the device management rule, whether the privacy data of the target user match privacy data of a pre-registered user; and sending the resource transfer request to a first server corresponding to the target application if the privacy data of the target user match the privacy data of the pre-registered user, to trigger the first server to perform resource transfer processing based on the resource transfer request.

Embodiments of this specification provide a resource transfer apparatus, where the apparatus includes: a request acquisition module, configured to obtain a resource transfer request triggered by a target user by using a target application, where the resource transfer request includes verification information used to perform resource transfer processing and identity feature information of the target user; a verification module, configured to verify the verification information by using the target application, and invoke, if the verification succeeds, a local device management rule by using the target application, and determine, by using the device management rule, whether the identity feature information of the target user matches identity feature information of a pre-registered user; and a request forwarding module, configured to send the resource transfer request to a first server corresponding to the target application if the identity feature information of the target user matches the identity feature information of the pre-registered user, to trigger the first server to perform resource transfer processing based on the resource transfer request.

Embodiments of this specification provide a privacy protection-based resource transfer apparatus, where a trusted execution environment (TEE) is set in the apparatus, and the apparatus includes: a resource transfer request module, configured to obtain a resource transfer request triggered by a target user by using a target application, where the resource transfer request includes verification information used to perform resource transfer processing and privacy data of the target user, and the privacy data include information used to represent an identity feature of the target user; a privacy processing module, configured to verify the verification information by using the target application, and invoke, if the verification succeeds, a local device management rule in the TEE by using the target application, and determine, in the TEE by using the device management rule, whether the privacy data of the target user match privacy data of a pre-registered user; and a resource transfer processing module, configured to send the resource transfer request to a first server corresponding to the target application if the privacy data of the target user match the privacy data of the pre-registered user, to trigger the first server to perform resource transfer processing based on the resource transfer request.

Embodiments of this specification provide a resource transfer device, including a processor, and a memory, configured to store computer-executable instructions. When the executable instructions are executed, the processor performs the following steps: obtaining a resource transfer request triggered by a target user by using a target application, where the resource transfer request includes verification information used to perform resource transfer processing and identity feature information of the target user; verifying the verification information by using the target application, and invoking, if the verification succeeds, a local device management rule by using the target application, and determining, by using the device management rule, whether the identity feature information of the target user matches identity feature information of a pre-registered user; and sending the resource transfer request to a first server corresponding to the target application if the identity feature information of the target user matches the identity feature information of the pre-registered user, to trigger the first server to perform resource transfer processing based on the resource transfer request.

Embodiments of this specification provide a device, where a trusted execution environment TEE is set in the device, and the device includes: a processor, and a memory, configured to store computer-executable instructions. When the executable instructions are executed, the processor performs the following steps: obtaining a resource transfer request triggered by a target user by using a target application, where the resource transfer request includes verification information used to perform resource transfer processing and privacy data of the target user, and the privacy data include information used to represent an identity feature of the target user; verifying the verification information by using the target application, and invoking, if the verification succeeds, a local device management rule in the TEE by using the target application, and determining, in the TEE by using the device management rule, whether the privacy data of the target user match privacy data of a pre-registered user; and sending the resource transfer request to a first server corresponding to the target application if the privacy data of the target user match the privacy data of the pre-registered user, to trigger the first server to perform resource transfer processing based on the resource transfer request.

Embodiments of this specification further provide a storage medium, where the storage medium is configured to store computer-executable instructions. When the executable instructions are executed, the following process is implemented: obtaining a resource transfer request triggered by a target user by using a target application, where the resource transfer request includes verification information used to perform resource transfer processing and identity feature information of the target user; verifying the verification information by using the target application, and invoking, if the verification succeeds, a local device management rule by using the target application, and determining, by using the device management rule, whether the identity feature information of the target user matches identity feature information of a pre-registered user; and sending the resource transfer request to a first server corresponding to the target application if the identity feature information of the target user matches the identity feature information of the pre-registered user, to trigger the first server to perform resource transfer processing based on the resource transfer request.

Embodiments of this specification further provide a storage medium, where the storage medium is configured to store computer-executable instructions. When the executable instructions are executed, the following process is implemented: obtaining a resource transfer request triggered by a target user by using a target application, where the resource transfer request includes verification information used to perform resource transfer processing and privacy data of the target user, and the privacy data include information used to represent an identity feature of the target user; verifying the verification information by using the target application, and invoking, if the verification succeeds, a local device management rule in the TEE by using the target application, and determining, in the TEE by using the device management rule, whether the privacy data of the target user match privacy data of a pre-registered user; and sending the resource transfer request to a first server corresponding to the target application if the privacy data of the target user match the privacy data of the pre-registered user, to trigger the first server to perform resource transfer processing based on the resource transfer request.

BRIEF DESCRIPTION OF DRAWINGS

To describe the technical solutions in some embodiments of this specification or in an existing technology more clearly, the following briefly describes the accompanying drawings needed for describing the embodiments or the existing technology. Clearly, the accompanying drawings in the following descriptions merely show some embodiments of this specification, and a person of ordinary skill in the art can still derive other drawings from these accompanying drawings without creative efforts.

FIG. 1 shows embodiments of a resource transfer method, according to this specification;

FIG. 3 shows embodiments of another resource transfer method, according to this specification;

FIG. 6 shows embodiments of a privacy protection-based resource transfer method, according to this specification;

FIG. 7 shows embodiments of another privacy protection-based resource transfer method, according to this specification;

DESCRIPTION OF EMBODIMENTS

Figure 2:
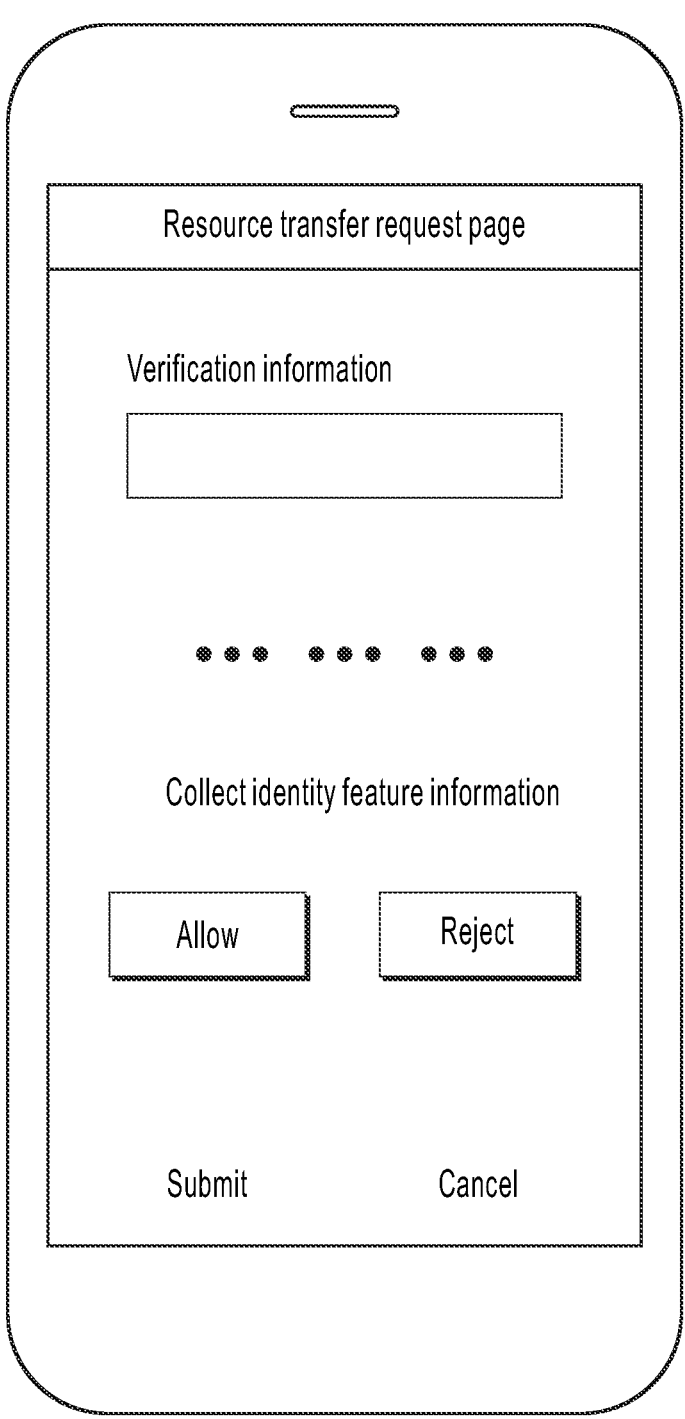
FIG. 2 is a schematic diagram illustrating a resource transfer page, according to this specification.

Embodiments of this specification provide a resource transfer method, apparatus, and device.

To make a person skilled in the art better understand the technical solutions in this specification, the following clearly and comprehensively describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on the embodiments of the present specification without creative efforts shall fall within the protection scope of the present specification.

Embodiment 1: As shown in FIG. 1, embodiments of this specification provide a resource transfer method. The method can be performed by a terminal device. The terminal device can be a mobile terminal device such as a mobile phone or a tablet computer, or can be a device such as a personal computer or a notebook computer, or can be a wearable device such as a watch or a band having an application for performing resource transfer processing, or can be an Internet of Things device having an application for performing resource transfer processing, specifically for example, an in-vehicle device or a smart home device having an application for performing resource transfer processing. The method can specifically include the following steps: Step S102. Obtain a resource transfer request triggered by a target user by using a target application, where the resource transfer request includes verification information used to perform resource transfer processing and identity feature information of the target user.

The target user can be any user, and can be specifically an owner of a current terminal device, or can be only a user of a current terminal device. The target application can be any application. In embodiments of this specification, the target application can be an application that provides a user with a service related to resource transfer. For example, the target application can be an application corresponding to a certain financial service, or can be an application corresponding to a certain instant messaging service. This can be specifically set based on an actual situation. The resource transfer request can be information for requesting to transfer possession of a specific quantity of resources in a certain account to another account, and the resource transfer request can be embodied in a plurality of different ways. For example, the resource transfer request can be a payment request, an equivalent exchange request, etc. The verification information can be information used to verify current resource transfer. The verification information can be implemented in a plurality of different ways. For example, the verification information can be a verification password, a password, or biometric feature information for resource transfer. The biometric feature information can include one or more of facial feature information, fingerprint feature information, palmprint feature information, iris feature information, heart rate feature information, and voiceprint feature information, specifically for example, a payment password used by the user for payment or facial feature information used for facial recognition-based payment. The identity feature information can be related information used to prove an identity of the target user, for example, facial feature information of the target user, fingerprint feature information of the target user, or identity document information of the target user. This can be specifically set based on an actual situation. No limitation is imposed in the embodiments of this specification.

In implementation, with the continuous development of Internet and terminal technologies, people are increasingly dependent on terminal devices in their work and life. People use the terminal device to store important personal information, and can use the terminal device to process various important services (such as a financial service or an instant messaging service). If the terminal device is lost or stolen, problems are caused to the user. Currently, applications of some important services often verifies a predetermined corresponding password, fingerprint feature information, facial feature information, etc. to verify validity of initiating a current service. However, if information such as the predetermined payment password is leaked, it poses a significant security threat to resources (such as assets) of the user. That is, when the user's terminal device and the information such as the predetermined payment password are obtained by a thief, the thief can steal resources in an account of the user, for example, can perform operations such as transfer, malicious consumption, and money laundering on the resources in the account of the user. As a result, when the terminal device is lost or stolen, the user is exposed to a risk such as theft of huge data and financial assets. Therefore, a solution to a problem that resources of a user are stolen when information such as a terminal device of the user is lost and predetermined verification information is also stolen needs to be provided. The embodiments of this specification provide an implementable technical solution that can specifically include the following content: The user (that is, the target user) can be pre-registered with a transaction platform, a financial service platform, an instant messaging service platform, etc. In practice, the user may not need to be pre-registered with the above-mentioned platform. In addition, the user can perform, in advance on the transaction platform, processing such as binding on a resource account that needs to be used. An application (that is, the target application) that provides a corresponding service can be set on the above-mentioned platform. A resource transfer trigger mechanism can be set in the target application. The trigger mechanism can be implemented in a plurality of different ways, for example, can be implemented by using a predetermined hyperlink, a button, etc. This can be specifically set based on an actual situation. When the target user needs to execute a certain service that needs resource transfer, the target user can start the target application installed in the terminal device, and can find a trigger method of the service in the target application. Then, the target user can trigger execution of the service by using the trigger method, specifically for example, the target user can find a trigger button for transfer in the target application, and then the target user can click the trigger button, so that the terminal device can perform corresponding processing based on a processing process of the service.

The terminal device can obtain related data of the service, and can load the data into a page of the target application. As shown in FIG. 2, the page can be a resource transfer request page. The page can include an input box of verification information for performing resource transfer processing. The target user can input, in the input box, verification information (such as a payment password or facial feature information) for performing resource transfer processing. After the input is completed, the terminal device can obtain the verification information input by the target user, and can obtain other related information (such as currently logged-in account information, device information of the terminal device, and an IP address). A resource transfer request can be generated based on the previously obtained information. Then, the resource transfer request can be output to an output port of the terminal device by using the target application. The terminal device can obtain the resource transfer request.

For example, when the user needs to perform a certain transaction, the user can start the target application to log in to the transaction platform, and can find related information of the transaction in the transaction platform, for example, related information of a transaction object (such as a name and a quantity of the transaction object) and a transaction time. Then, the user can select the related information of the transaction by using the corresponding target application. After selection is completed, the target application can provide a verification information input page. The target user can input verification information. After the input is completed, the target application can generate a resource transfer request based on the related information and the verification information, and can submit the resource transfer request to the terminal device. The terminal device can obtain the resource transfer request.

Step S104. Verify the verification information by using the target application, and invoke, if the verification succeeds, a local device management rule by using the target application, and determine, by using the device management rule, whether the identity feature information of the target user matches identity feature information of a pre-registered user.

The device management rule can be a rule used to verify an identity of a current user of the terminal device. The device management rule can be implemented in a plurality of different ways. This be specifically set based on an actual situation.

In implementation, to avoid the following case where another person may steal personal information of the user in the terminal device or change registration information of the terminal device after the terminal device of the user is lost or stolen, a device account registration mechanism can be predetermined. Device account registration can be performed by binding the identity feature information of the user of the terminal device with the device information of the terminal device. That is, the terminal device sends an account registration request of the terminal device to a server, where the account registration request includes the identity feature information of the target user that the terminal device belongs to and the device information of the terminal device. Then, the server performs identity verification on the current user. If the identity verification succeeds, the server performs device account registration processing on the terminal device based on the identity feature information and the device information to obtain device account registration information. Then, the server can perform binding processing on the identity feature information and the device information to obtain bound information, store the device account registration information and the bound information, and adjust a state of the terminal device to a registered state. As such, the terminal device can also store the state (that is, the registered state or the unregistered state) of the terminal device and the identity feature information of the user in the above-mentioned registration process.

After obtaining the resource transfer request, the terminal device can obtain, by using the target application, predetermined verification information for performing resource transfer (for example, the target application can obtain, from a server corresponding to the target application, the predetermined verification information for performing resource transfer) to verify the above-mentioned verification information (for example, determine, through comparison, whether the predetermined verification information for performing resource transfer is the same as the above-mentioned verification information; and if yes, the verification succeeds; otherwise, the verification fails). The device management rule can be predetermined in the terminal device. If the verification succeeds, the local device management rule is invoked by using the target application, and it is determined, by using the device management rule, whether the identity feature information of the target user matches the identity feature information of the pre-registered user.

Step S106. Send the resource transfer request to a first server corresponding to the target application if the identity feature information of the target user matches the identity feature information of the pre-registered user, to trigger the first server to perform resource transfer processing based on the resource transfer request.

In implementation, if the identity feature information of the target user matches the identity feature information of the pre-registered user, it is determined that the target user is a user who performs device account registration in advance. In this case, the resource transfer request can be sent to the first server corresponding to the target application, and the first server can perform resource transfer processing based on the resource transfer request.

The embodiments of this specification provide a resource transfer method, where a resource transfer request triggered by a target user by using a target application is obtained, where the resource transfer request includes verification information used to perform resource transfer processing and identity feature information of the target user; then, the verification information is verified by using the target application, and if the verification succeeds, a local device management rule is invoked by using the target application, and it is determined, by using the device management rule, whether the identity feature information of the target user matches identity feature information of a pre-registered user; and the resource transfer request is sent to a first server corresponding to the target application if the identity feature information of the target user matches the identity feature information of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

Embodiment 2: As shown in FIG. 3, embodiments of this specification provide a resource transfer method. The method can be performed by a terminal device. The terminal device can be a mobile terminal device such as a mobile phone or a tablet computer, or can be a device such as a personal computer or a notebook computer, or can be a wearable device such as a watch or a band having an application for performing resource transfer processing, or can be an Internet of Things device having an application for performing resource transfer processing, specifically for example, an in-vehicle device or a smart home device having an application for performing resource transfer processing. The method can specifically include the following steps: Step S302. Obtain a resource transfer request triggered by a target user by using a target application, where the resource transfer request includes verification information used to perform resource transfer processing and identity feature information of the target user.

The identity feature information can include one or more of biological feature information of the target user, information about a predetermined document of the target user, and a predetermined user key of the target user. The biological feature information of the target user can include one or more of facial feature information, fingerprint feature information, palmprint feature information, iris feature information, heart rate feature information, and voiceprint feature information of the target user. The predetermined document can be a document that can prove an identity of the target user, for example, an identity document, a social security card, and a passport. This can be specifically set based on an actual situation. No limitation is imposed in the embodiments of this specification. The predetermined user password can be a password that is predetermined for the target user and that can be used to verify an identity of the target user. This can be specifically set based on an actual situation. No limitation is imposed in the embodiments of this specification. The identity feature information can include one or more pieces of the above-mentioned information, and can further include a plurality of types of information. This can be specifically set based on an actual situation. No limitation is imposed in the embodiments of this specification.

Step S304. Verify the verification information by using the target application.

In practice, the resource transfer request can include the verification information used to perform resource transfer processing and the identity feature information of the target user, and can further include a quantity of resources that resource transfer is to be performed on, specifically for example, a payment amount. Based on this, processing can be further performed in the following method. For details, references can be made to processing in the following steps S306 and S308.

Step S306. If the verification succeeds, and the quantity of resources that resource transfer is to be performed on satisfies a predetermined verification condition, obtain the identity feature information of the target user and device information of a current device, and obtain identity feature information of a pre-registered user corresponding to the device information from pre-stored device account registration information.

The predetermined verification condition can be a predetermined condition used to trigger identity verification. For example, the predetermined verification condition can be that the quantity of resources that resource transfer is to be performed on exceeds a predetermined threshold. Specifically for example, the predetermined verification condition can be that a payment amount exceeds 500 RMB. This can be specifically set based on an actual situation. No limitation is imposed in the embodiments of this specification. The device information can include one or more of a device identifier of the terminal device, a predetermined device key of the terminal device, and device feature information of the terminal device. The device identifier can be a name, code, etc. of the terminal device. The predetermined device key can be a device key that is predetermined. This can be specifically set based on an actual situation. The device feature information can be a MAC address, an IMEI number, etc. of the terminal device. This can be specifically set based on an actual situation. The device account registration information can be information obtained by a second server after performing the following steps: when the second server receives an account registration request that is of a terminal device corresponding to the device information and that is sent by the terminal device, and detects, based on device information included in the account registration request, that the terminal device is in an unregistered state, the second server verifies an identity of a registered user of the terminal device based on identity feature information included in the account registration request, and performs, based on the identity feature information and the device information, device account registration processing on the terminal device when the verification succeeds.

Figure 4:
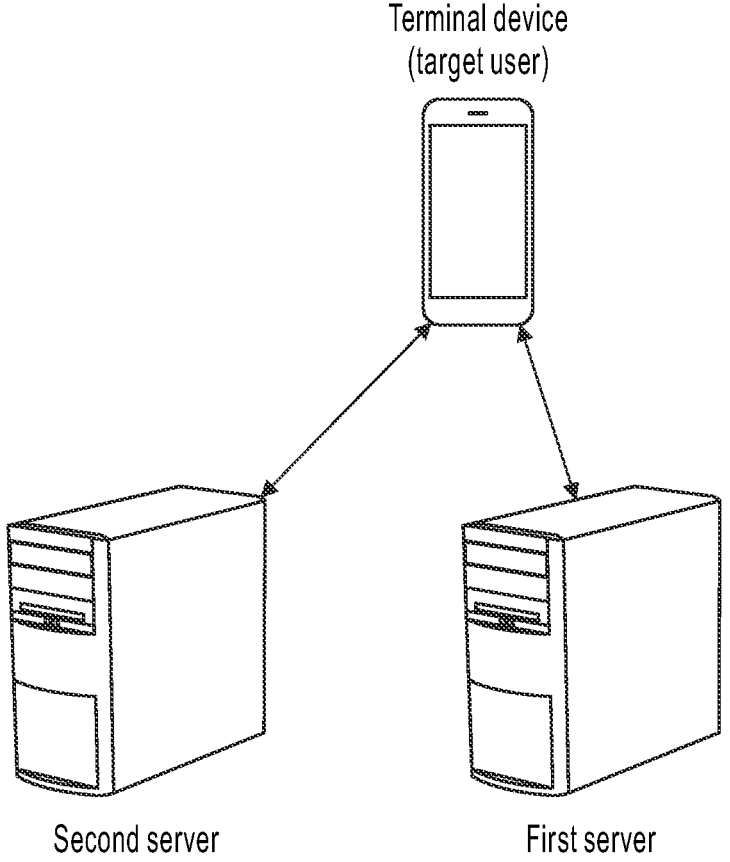
FIG. 4 is a schematic diagram illustrating a structure of a resource transfer system, according to this specification.

In implementation, as shown in FIG. 4, the second server receives an account registration request of a terminal device sent by the terminal device, where the account registration request includes identity feature information of a user that the terminal device belongs to and device information of the terminal device. If the second server detects, based on the device information, that the terminal device is in a registered state, the second server cancels device account registration processing corresponding to the account registration request. If the second server detects, based on the device information, that the terminal device is in an unregistered state, the second server sends an identity verification request to an identity verification server, where the identity verification request includes the identity feature information; and receives a verification result that is of the identity feature information and that is sent by the identity verification server, where the verification result is obtained by the identity verification server by matching locally stored reference identity feature information of a target user with the identity feature information. The identity verification server can be configured to perform identity verification on the user. The second server determines whether the identity feature information matches the reference identity feature information, to perform identity verification on the user. When the verification succeeds, the second server performs device account registration processing on the terminal device based on the identity feature information and the device information to obtain device account registration information. The second server performs binding processing on the identity feature information and the device information to obtain bound information, stores the device account registration information and the bound information, and adjusts a state of the terminal device to a registered state, so that the terminal device can also store the state information of the terminal device, and the identity feature information of the user and the device account registration information during registration.

After the above-mentioned processing, the device account registration information of the terminal device can be set in the second server, to ensure that when the terminal device of the user is lost or stolen, the black industry cannot tamper with or erase the device account registration information of the terminal device through offline flashing, damage, vulnerabilities, etc. Therefore, a risk such as theft of huge data and financial assets of the user can be avoided, and processing such as identity registration, deregistration, and recognition management can be implemented on a trusted device owner of the terminal device.

If the verification succeeds, a quantity of resources that resource transfer is to be performed on is be obtained. Then, the quantity of resources can be matched with the predetermined verification condition. If the quantity of resources that resource transfer is to be performed on satisfies the predetermined verification condition, the identity feature information of the target user and the device information of the current terminal device can be obtained, and the identity feature information of the pre-registered user corresponding to the device information is obtained from the pre-stored device account registration information.

Step S308. Invoke a local device management rule by using the target application, and determine, by using the device management rule, whether the identity feature information of the target user matches the identity feature information of the pre-registered user.

For specific processing of the above-mentioned step S308, references can be made to related content in Embodiment 1. Details are omitted here for simplicity.

The above-mentioned step S308 can have various specific processing methods. In addition to being implemented in the method provided in the above-mentioned Embodiment 1, step S308 can be implemented in a plurality of methods. The following further provides an optional processing method that can specifically include processing in the following step A2 and step A4.

Step A2. Obtain the identity feature information of the target user and device information of a current device, obtain, from device account registration information stored in a second server, first device account registration information that includes the device information, and obtain identity feature information of a pre-registered user corresponding to the device information from the first device account registration information.

In implementation, to reduce a data storage pressure of the terminal device, the device account registration information can be stored in the second server. As such, after obtaining the identity feature information of the target user and the device information of the current device, the terminal device can send a data request to the second server, where the data request can include the device information. After receiving the data request, the second server can extract the device information from the data request. Then, the second server can obtain, from the pre-stored device account registration information, the first device account registration information that includes the device information, and can send the first device account registration information to the terminal device. The terminal device can extract the identity feature information of the pre-registered user corresponding to the device information from the first device account registration information.

Step A4. Determine, by using the device management rule, whether the identity feature information of the target user matches the identity feature information of the pre-registered user.

Step S310. If the identity feature information of the target user matches the identity feature information of the pre-registered user, verify the verification information; and if the verification succeeds, send the resource transfer request to a first server corresponding to the target application.

Step S312. If the identity feature information of the target user does not match the identity feature information of the pre-registered user, send a notification message indicating an identity verification abnormality to a third server, to trigger the third server to determine whether to continue to perform resource transfer processing corresponding to the resource transfer request.

Figure 5:
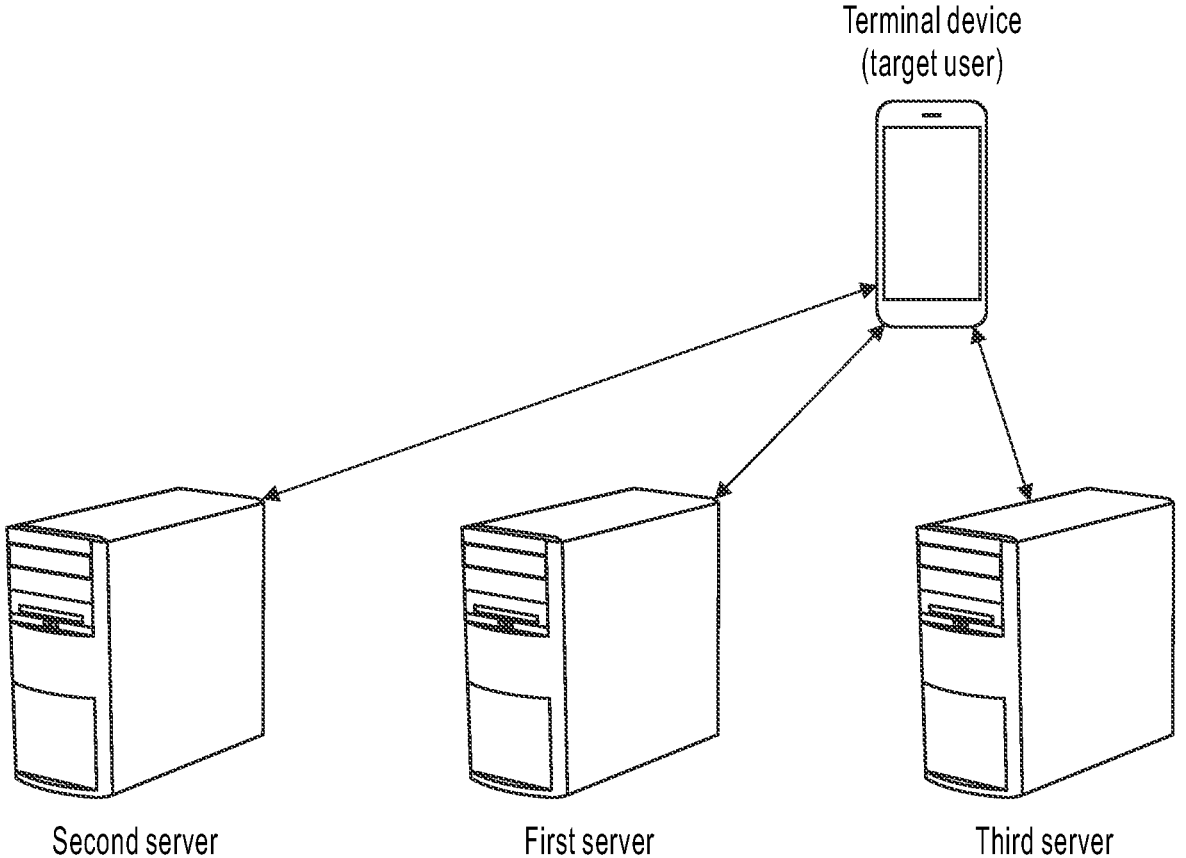
FIG. 5 is a schematic diagram illustrating a structure of another resource transfer system, according to this specification.

In implementation, if the identity feature information of the target user does not match the identity feature information of the pre-registered user, it can be determined that the target user is not a registered user of the terminal device. In this case, as shown in FIG. 5, a notification message indicating an identity verification abnormality can be reported to the third server, to notify a resource transfer management party that an abnormal behavior is suspected of occurring on a current terminal device, for example, the current terminal device is stolen. A risk prevention and control policy can be set in the third server. After receiving the notification message, the third server can obtain related data in a current resource transfer process, and can analyze the obtained related data by using the risk prevention and control policy, to determine whether to allow the target user to continue to perform resource transfer processing corresponding to the resource transfer request.

Step S314. If a notification message that is sent by the third server and that indicates to perform resource transfer processing corresponding to the resource transfer request is received, send the resource transfer request to a first server, to trigger the first server to perform resource transfer processing based on the resource transfer request.

The embodiments of this specification provide a resource transfer method, where a resource transfer request triggered by a target user by using a target application is obtained, where the resource transfer request includes verification information used to perform resource transfer processing and identity feature information of the target user; then, the verification information is verified by using the target application, and if the verification succeeds, a local device management rule is invoked by using the target application, and it is determined, by using the device management rule, whether the identity feature information of the target user matches identity feature information of a pre-registered user; and the resource transfer request is sent to a first server corresponding to the target application if the identity feature information of the target user matches the identity feature information of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Embodiment 3: As shown in FIG. 6, embodiments of this specification provide a privacy protection-based resource transfer method. The method can be performed by a terminal device. A trusted execution environment (TEE) can be set in the terminal device. The trusted execution environment can be implemented by using a program written in a predetermined programming language (that is, can be implemented in a form of software), or can be implemented in a form of software and hardware. The terminal device can be a mobile terminal device such as a mobile phone or a tablet computer, or can be a device such as a personal computer or a notebook computer, or can be a wearable device such as a watch or a band having an application for performing resource transfer processing, or can be an Internet of Things device having an application for performing resource transfer processing, specifically for example, an in-vehicle device or a smart home device having an application for performing resource transfer processing. The method can specifically include the following steps: Step S602. Obtain a resource transfer request triggered by a target user by using a target application, where the resource transfer request includes verification information used to perform resource transfer processing and privacy data of the target user, and the privacy data include information used to represent an identity feature of the target user.

The identity feature can be related information used to prove an identity of the target user, for example, a facial feature of the target user, a fingerprint feature of the target user, or an identity document feature of the target user. This can be specifically set based on an actual situation. No limitation is imposed in the embodiments of this specification. The privacy data can include just the information used to represent the identity feature of the target user, or can also include other related information in addition to the information used to represent the identity feature of the target user, for example, geographical location information, an account number, and a password of the target user. This can be specifically set based on an actual situation. No limitation is imposed in the embodiments of this specification.

Step S604. Verify the verification information by using the target application, and invoke, if the verification succeeds, a local device management rule in the TEE by using the target application, and determine, in the TEE by using the device management rule, whether the privacy data of the target user match privacy data of a pre-registered user.

The privacy data of the user can be related information that is obtained after a corresponding terminal device is pre-registered, that is bound with device information of the terminal device, and that is used to represent the identity of the user. In practice, the privacy data of the user can include other related information in addition to the information used to represent the identity feature of the target user, for example, geographical location information, an account number, and a password of the target user. This can be specifically set based on an actual situation. No limitation is imposed in the embodiments of this specification. The TEE can be implemented by using a program written in a predetermined programming language (that is, can be implemented in a form of software), or can be implemented in a form of software and hardware. The trusted execution environment (TEE) can be a data processing environment that is secure and isolated from another environment. To be specific, processing performed in the trusted execution environment and data generated in a data processing process cannot be accessed by another execution environment or an application outside the executable environment. The trusted execution environment (TEE) can be implemented by creating a small operating system that can run independently in a trusted zone (for example, TrustZone), and the TEE can directly provide a service through a system call (for example, direct processing by a TrustZone kernel). The terminal device can include a rich execution environment (REE) and a TEE. An operating system, such as an Android operating system, an IOS operating system, a Windows operating system, or a Linux operating system, installed on the terminal device can be run in the REE. The REE is characterized by robust functionality, openness, and good scalability, and can provide an upper-layer application with all functions of the terminal device, such as a camera function and a touch function. However, many security risks exist in the REE. For example, the operating system can obtain all data of a certain application, but it is difficult to verify whether the operating system or the application is tampered with. If the operating system or the application is tampered with, user information has a large security hazard. Therefore, processing needs to be performed in the TEE of the terminal device. The TEE has its own execution space. In other words, one operating system also exists in the TEE. The TEE has a higher security level than the REE. Software and hardware resources in the terminal device that are accessible by the TEE are separated from the REE, but the TEE can directly obtain information in the REE, and the REE cannot obtain information in the TEE. The TEE can perform processing such as verification by using a provided interface, to ensure that user information (such as payment information and user privacy information) is not tampered with, no password is hijacked, and information such as a fingerprint feature or a facial feature is not stolen.

In implementation, the device management rule can be predetermined in the TEE, to prevent the device management rule from being tampered with. The verification information is verified by using the target application. If the verification succeeds, the device management rule in the local TEE is invoked by using the target application. As such, the target application can be prevented from directly operating the privacy data of the user, thereby protecting security of the privacy data of the user. Then, in the executable environment (TEE), the device management rule can be used to determine whether the identity feature information of the target user matches the identity feature information of the pre-registered user, so that the privacy data are processed in the trusted execution environment (TEE), the privacy data can be protected from being obtained by the target application or another application, and the privacy data can be prevented from being leaked.

Step S606. Send the resource transfer request to a first server corresponding to the target application if the privacy data of the target user match the privacy data of the pre-registered user, to trigger the first server to perform resource transfer processing based on the resource transfer request.

The embodiments of this specification provide a privacy protection-based resource transfer method, applied to a terminal device. A trusted execution environment (TEE) is set in the terminal device, where when a resource transfer request (the resource transfer request includes verification information used to perform resource transfer processing and privacy data of the target user, and the privacy data include information used to represent an identity feature of the target user) triggered by a target user by using a target application is obtained, the verification information is verified by using the target application, and if the verification succeeds, a local device management rule in the TEE is invoked by using the target application, and it is determined, in the TEE by using the device management rule, whether the privacy data of the target user match privacy data of a pre-registered user; and the resource transfer request is sent to a first server corresponding to the target application if the privacy data of the target user match the privacy data of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

Embodiment 4: As shown in FIG. 7, embodiments of this specification provide a privacy protection-based resource transfer method. The method can be performed by a terminal device. A trusted execution environment (TEE) can be set in the terminal device. The trusted execution environment can be implemented by using a program written in a predetermined programming language (that is, can be implemented in a form of software), or can be implemented in a form of software and hardware. The terminal device can be a mobile terminal device such as a mobile phone or a tablet computer, or can be a device such as a personal computer or a notebook computer, or can be a wearable device such as a watch or a band having an application for performing resource transfer processing, or can be an Internet of Things device having an application for performing resource transfer processing, specifically for example, an in-vehicle device or a smart home device having an application for performing resource transfer processing. The method can specifically include the following steps: Step S702. Obtain a resource transfer request triggered by a target user by using a target application, where the resource transfer request includes verification information used to perform resource transfer processing and privacy data of the target user, and the privacy data include information used to represent an identity feature of the target user.

The identity feature can include one or more of a biological feature of the target user, a predetermined document feature of the target user, and a predetermined user key of the target user. The biological feature of the target user can include one or more of a facial feature, a fingerprint feature, a palmprint feature, an iris feature, a heart rate feature, and a voiceprint feature of the target user. The predetermined document can be a document that can prove an identity of the target user, for example, an identity document, a social security card, and a passport. This can be specifically set based on an actual situation. No limitation is imposed in the embodiments of this specification. The predetermined user password can be a password that is predetermined for the target user and that can be used to verify an identity of the target user. This can be specifically set based on an actual situation. No limitation is imposed in the embodiments of this specification. The identity feature can include one or more pieces of the above-mentioned information, and can further include a plurality of types of information. This can be specifically set based on an actual situation. No limitation is imposed in the embodiments of this specification.

Step S704. Verify the verification information by using the target application.

In practice, the resource transfer request can include the verification information used to perform resource transfer processing and the identity feature information of the target user, and can further include a quantity of resources that resource transfer is to be performed on, specifically for example, a payment amount. Based on this, processing can be further performed in the following method. For details, references can be made to processing in the following steps S706 and S708.

Step S706. If the verification succeeds, and the quantity of resources that resource transfer is to be performed on satisfies a predetermined verification condition, invoke a local device management rule in the TEE by using the target application, transmit the privacy data of the target user and device information of a current device to the TEE, and obtain, in the TEE, privacy data of a pre-registered user corresponding to the device information from pre-stored device account registration information.

The device account registration information can be stored in the TEE of the terminal device, or can be pre-stored in another trusted device (for example, in a specified server (references can be made to the above-mentioned related content of the second server, and details are omitted here for simplicity) or in a blockchain system). In this case, storage address information of the device account registration information can be obtained, and the storage address information can be set in the TEE of the terminal device. When the device account registration information needs to be used, the device account registration information can be obtained based on the storage address information. In addition, to protect security of a data transmission process, a trusted application used to transmit data in resource transfer can be predetermined, the privacy data of the target user and the device information of the current device can be obtained by using the trusted application, and then the privacy data of the target user and the device information of the current device can be transmitted to the TEE by using the trusted application.

In practice, to ensure data transmission security, data to be transmitted can be encrypted, and then decrypted in the TEE. Based on this, the above-mentioned processing of transmitting the privacy data of the target user and device information of a current device to the TEE can include the following content: performing encryption processing on the privacy data of the target user and the device information of the current device, and transmitting the encrypted privacy data of the target user and the encrypted device information of the current device to the TEE. Then, in the TEE, decryption processing can be performed on the encrypted privacy data of the target user and the encrypted device information of the current device to obtain the decrypted privacy data of the target user and the decrypted device information of the current device.

A plurality of encryption algorithms can be used for performing encryption processing, for example, can include a symmetric encryption algorithm or an asymmetric encryption algorithm. There can also be a plurality of symmetric encryption algorithms and a plurality of asymmetric encryption algorithms. This can be specifically set based on an actual situation. No limitation is imposed in the embodiments of this specification.

Step S708. Determine, in the TEE by using the device management rule, whether the privacy data of the target user match the privacy data of the pre-registered user.

For specific processing of step S708, references can be made to related content in the above-mentioned embodiments. Details are omitted here for simplicity.

Step S710. If the privacy data of the target user match the privacy data of the pre-registered user, verify the verification information; and if the verification succeeds, send the resource transfer request to a first server corresponding to the target application.

Step S712. If the privacy data of the target user do not match the privacy data of the pre-registered user, send a notification message indicating an identity verification abnormality to a third server, to trigger the third server to determine whether to continue to perform resource transfer processing corresponding to the resource transfer request.

Step S714. If a notification message that is sent by the third server and that indicates to perform resource transfer processing corresponding to the resource transfer request is received, send the resource transfer request to a first server, to trigger the first server to perform resource transfer processing based on the resource transfer request.

In practice, the device account registration information and/or the device management rule stored in the TEE can be further updated. For details, references can be made to processing in the following steps S716 and S718.

Step S716. Receive an update request for target data in the TEE, where the update request includes data to be updated, the data to be updated are ciphertext, and the target data include the device account registration information and/or the device management rule.

Step S718. Transmit the data to be updated to the TEE, decrypt the data to be updated in the TEE, and update the target data based on the decrypted data to be updated.

The embodiments of this specification provide a privacy protection-based resource transfer method, applied to a terminal device. A trusted execution environment (TEE) is set in the terminal device, where when a resource transfer request (the resource transfer request includes verification information used to perform resource transfer processing and privacy data of the target user, and the privacy data include information used to represent an identity feature of the target user) triggered by a target user by using a target application is obtained, the verification information is verified by using the target application, and if the verification succeeds, a local device management rule in the TEE is invoked by using the target application, and it is determined, in the TEE by using the device management rule, whether the privacy data of the target user match privacy data of a pre-registered user; and the resource transfer request is sent to a first server corresponding to the target application if the privacy data of the target user match the privacy data of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Figure 8:
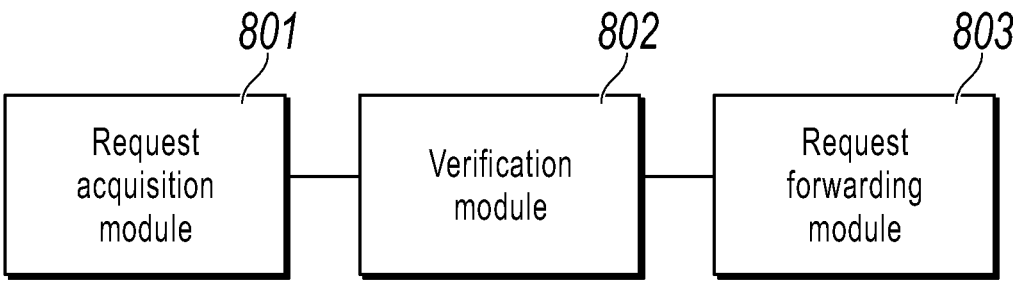
FIG. 8 shows embodiments of a resource transfer apparatus, according to this specification.

Embodiment 5: The resource transfer method provided in the embodiments of this specification has been described above. Based on the same idea, embodiments of this specification further provide a resource transfer apparatus, as shown in FIG. 8.

The resource transfer apparatus includes a request acquisition module 801, a verification module 802, and a request forwarding module 803, where the request acquisition module 801 is configured to obtain a resource transfer request triggered by a target user by using a target application, where the resource transfer request includes verification information used to perform resource transfer processing and identity feature information of the target user; the verification module 802 is configured to verify the verification information by using the target application, and invoke, if the verification succeeds, a local device management rule by using the target application, and determine, by using the device management rule, whether the identity feature information of the target user matches identity feature information of a pre-registered user; and the request forwarding module 803 is configured to send the resource transfer request to a first server corresponding to the target application if the identity feature information of the target user matches the identity feature information of the pre-registered user, to trigger the first server to perform resource transfer processing based on the resource transfer request.

In the embodiments of this specification, the resource transfer request includes a quantity of resources that resource transfer is to be performed on; and the verification module 802 is configured to: if the verification succeeds, and the quantity of resources that resource transfer is to be performed on satisfies a predetermined verification condition, invoke the local device management rule by using the target application, and determine, by using the device management rule, whether the identity feature information of the target user matches the identity feature information of the pre-registered user.

In the embodiments of this specification, the request forwarding module 803 is configured to: if the identity feature information of the target user matches the identity feature information of the pre-registered user, verify the verification information; and if the verification succeeds, send the resource transfer request to the first server corresponding to the target application.

In the embodiments of this specification, the verification module 802 includes: a first information acquisition unit, configured to obtain the identity feature information of the target user and device information of a current device, and obtain identity feature information of a pre-registered user corresponding to the device information from pre-stored device account registration information; and a first verification unit, configured to determine, by using the device management rule, whether the identity feature information of the target user matches the identity feature information of the pre-registered user.

In the embodiments of this specification, the verification module 802 includes: a second information acquisition unit, configured to obtain the identity feature information of the target user and device information of a current device, obtain, from device account registration information stored in a second server, first device account registration information that includes the device information, and obtain identity feature information of a pre-registered user corresponding to the device information from the first device account registration information; and a second verification unit, configured to determine, by using the device management rule, whether the identity feature information of the target user matches the identity feature information of the pre-registered user.

In the embodiments of this specification, the device account registration information is information obtained by the second server after performing the following steps: when the second server receives an account registration request that is of a terminal device corresponding to the device information and that is sent by the terminal device, and detects, based on device information included in the account registration request, that the terminal device is in an unregistered state, the second server verifies an identity of a registered user of the terminal device based on identity feature information included in the account registration request, and performs, based on the identity feature information and the device information, device account registration processing on the terminal device when the verification succeeds.

In the embodiments of this specification, the identity feature information includes one or more of biometric feature information, information about a predetermined document, and a predetermined user key, and the device information includes one or more of a device identifier, a predetermined device key, and device feature information.

In the embodiments of this specification, the biometric feature information includes one or more of facial feature information, fingerprint feature information, palmprint feature information, iris feature information, heart rate feature information, and voiceprint feature information.

In the embodiments of this specification, the apparatus further includes: a notification module, configured to: if the identity feature information of the target user does not match the identity feature information of the pre-registered user, send a notification message indicating an identity verification abnormality to a third server, to trigger the third server to determine whether to continue to perform resource transfer processing corresponding to the resource transfer request; and a sending module, configured to: if a notification message that is sent by the third server and that indicates to perform resource transfer processing corresponding to the resource transfer request is received, send the resource transfer request to the first server, to trigger the first server to perform resource transfer processing based on the resource transfer request.

The embodiments of this specification provide a resource transfer apparatus, where a resource transfer request triggered by a target user by using a target application is obtained, where the resource transfer request includes verification information used to perform resource transfer processing and identity feature information of the target user; then, the verification information is verified by using the target application, and if the verification succeeds, a local device management rule is invoked by using the target application, and it is determined, by using the device management rule, whether the identity feature information of the target user matches identity feature information of a pre-registered user; and the resource transfer request is sent to a first server corresponding to the target application if the identity feature information of the target user matches the identity feature information of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Figure 9:
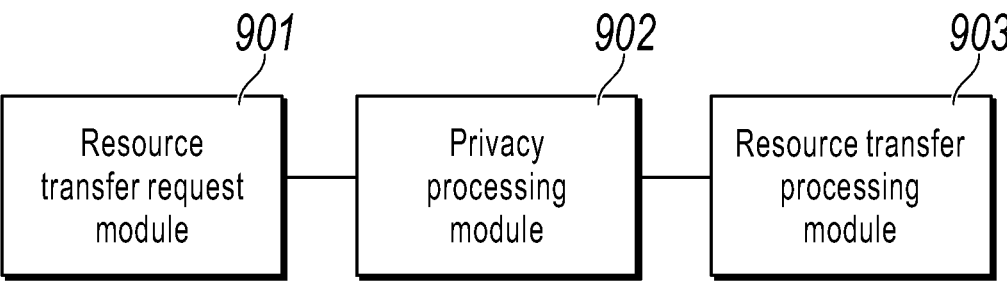
FIG. 9 shows embodiments of a privacy protection-based resource transfer apparatus, according to this specification.

Embodiment 6: Based on the same idea, embodiments of this specification further provide a privacy protection-based resource transfer apparatus, where a trusted execution environment (TEE) is set in the apparatus, as shown in FIG. 9.

The privacy protection-based resource transfer apparatus includes a resource transfer request module 901, a privacy processing module 902, and a resource transfer processing module 903, where the resource transfer request module 901 is configured to obtain a resource transfer request triggered by a target user by using a target application, where the resource transfer request includes verification information used to perform resource transfer processing and privacy data of the target user, and the privacy data include information used to represent an identity feature of the target user; the privacy processing module 902 is configured to verify the verification information by using the target application, and invoke, if the verification succeeds, a local device management rule in the TEE by using the target application, and determine, in the TEE by using the device management rule, whether the privacy data of the target user match privacy data of a pre-registered user; and the resource transfer processing module 903 is configured to send the resource transfer request to a first server corresponding to the target application if the privacy data of the target user match the privacy data of the pre-registered user, to trigger the first server to perform resource transfer processing based on the resource transfer request.

In the embodiments of this specification, the resource transfer request includes a quantity of resources that resource transfer is to be performed on; and the privacy processing module 902 is configured to transmit the privacy data of the target user and device information of a current device to the TEE, and obtain, in the TEE, privacy data of a pre-registered user corresponding to the device information from pre-stored device account registration information; and determine, in the TEE by using the device management rule, whether the privacy data of the target user match the privacy data of the pre-registered user.

In the embodiments of this specification, the resource transfer processing module 903 is configured to: if the privacy data of the target user match the privacy data of the pre-registered user, verify the verification information; and if the verification succeeds, send the resource transfer request to the first server corresponding to the target application.

In the embodiments of this specification, the apparatus further includes: an information acquisition module, configured to obtain the identity feature information of the target user and device information of a current device, obtain, from device account registration information stored in a second server, first device account registration information that includes the device information, and obtain identity feature information of a pre-registered user corresponding to the device information from the first device account registration information.

In the embodiments of this specification, the device account registration information is information obtained by the second server after performing the following steps: when the second server receives an account registration request that is of a terminal device corresponding to the device information and that is sent by the terminal device, and detects, based on device information comprised in the account registration request, that the terminal device is in an unregistered state, the second server verifies an identity of a registered user of the terminal device based on identity feature information comprised in the account registration request, and performs, based on the identity feature information and the device information, device account registration processing on the terminal device when the verification succeeds.

In the embodiments of this specification, the identity feature includes one or more of a biometric feature, a predetermined document feature, and a predetermined user key, and the device information includes one or more of a device identifier, a predetermined device key, and device feature information.

In the embodiments of this specification, the biometric feature includes one or more of a facial feature, a fingerprint feature, a palmprint feature, an iris feature, a heart rate feature, and a voiceprint feature.

In the embodiments of this specification, the apparatus further includes: a notification module, configured to: if the privacy data of the target user do not match the privacy data of the pre-registered user, send a notification message indicating an identity verification abnormality to a third server, to trigger the third server to determine whether to continue to perform resource transfer processing corresponding to the resource transfer request; and a sending module, configured to: if a notification message that is sent by the third server and that indicates to perform resource transfer processing corresponding to the resource transfer request is received, send the resource transfer request to the first server, to trigger the first server to perform resource transfer processing based on the resource transfer request.

In the embodiments of this specification, the privacy processing module 902 is configured to perform encryption processing on the privacy data of the target user and the device information of the current device, and transmit the encrypted privacy data of the target user and the encrypted device information of the current device to the TEE; and the apparatus further includes a decryption module, configured to perform, in the TEE, decryption processing on the encrypted privacy data of the target user and the encrypted device information of the current device to obtain the decrypted privacy data of the target user and the decrypted device information of the current device.

In the embodiments of this specification, the apparatus further includes: an update request module, configured to receive an update request for target data in the TEE, where the update request includes data to be updated, the data to be updated are ciphertext, and the target data include the device account registration information and/or the device management rule; and an update module, configured to transmit the data to be updated to the TEE, decrypt the data to be updated in the TEE, and update the target data based on the decrypted data to be updated.

The embodiments of this specification provide a privacy protection-based resource transfer apparatus. A trusted execution environment (TEE) is set in the apparatus, where when a resource transfer request (the resource transfer request includes verification information used to perform resource transfer processing and privacy data of the target user, and the privacy data include information used to represent an identity feature of the target user) triggered by a target user by using a target application is obtained, the verification information is verified by using the target application, and if the verification succeeds, a local device management rule in the TEE is invoked by using the target application, and it is determined, in the TEE by using the device management rule, whether the privacy data of the target user match privacy data of a pre-registered user; and the resource transfer request is sent to a first server corresponding to the target application if the privacy data of the target user match the privacy data of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Figure 10:
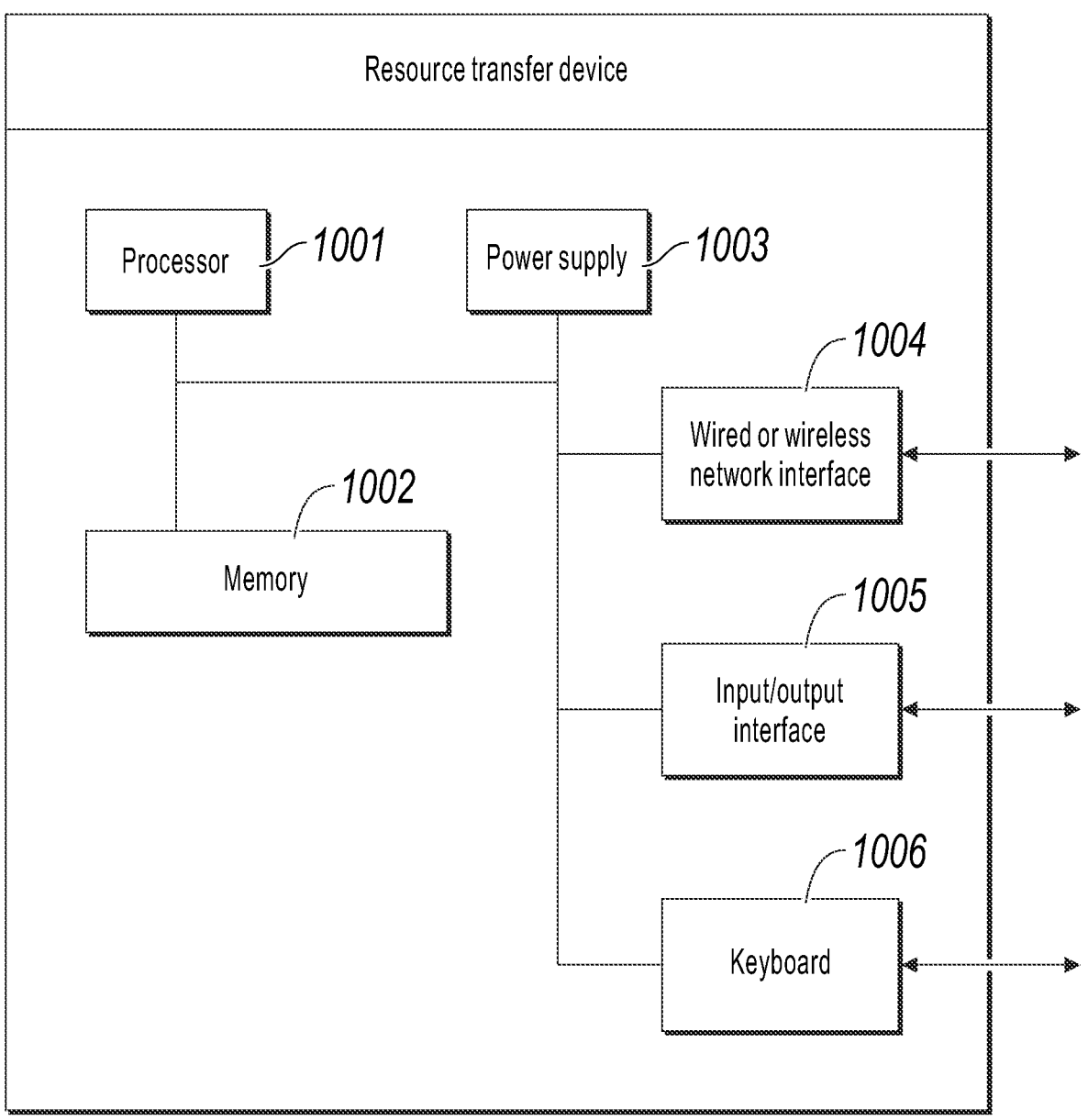
FIG. 10 shows embodiments of a resource transfer device, according to this specification.

Embodiment 7: The privacy protection-based resource transfer apparatus provided in the embodiments of this specification has been described above. Based on the same idea, embodiments of this specification further provide a resource transfer device, as shown in FIG. 10.

The resource transfer device can be the terminal device provided in the above-mentioned embodiments, and a trusted execution environment (TEE), etc. can be set in the terminal device.

The resource transfer device can vary greatly due to a configuration or performance difference, and can include one or more processors 1001 and a memory 1002. The memory 1002 can store one or more storage applications or data. The memory 1002 can be temporary storage or persistent storage. The application stored in the memory 1002 can include one or more modules (not shown in the figure), and each module can include a series of computer-executable instructions for the resource transfer device. Still further, the processor 1001 can be configured to communicate with the memory 1002 to execute a series of computer-executable instructions in the memory 1002 on the resource transfer device. The resource transfer device can further include one or more power supplies 1003, one or more wired or wireless network interfaces 1004, one or more input/output interfaces 1005, one or more keyboards 1006, etc.

Specifically, in the embodiments, the resource transfer device includes a memory and one or more programs. The one or more programs are stored in the memory. The one or more programs can include one or more modules. Each module can include a series of computer-executable instructions for the resource transfer device. One or more processors are configured to execute computer-executable instructions that are included in the one or more programs and that are used to perform the following: obtaining a resource transfer request triggered by a target user by using a target application, where the resource transfer request includes verification information used to perform resource transfer processing and identity feature information of the target user; verifying the verification information by using the target application, and invoking, if the verification succeeds, a local device management rule by using the target application, and determining, by using the device management rule, whether the identity feature information of the target user matches identity feature information of a pre-registered user; and sending the resource transfer request to a first server corresponding to the target application if the identity feature information of the target user matches the identity feature information of the pre-registered user, to trigger the first server to perform resource transfer processing based on the resource transfer request.

In the embodiments of this specification, the resource transfer request includes a quantity of resources that resource transfer is to be performed on; and the invoking, if the verification succeeds, a local device management rule by using the target application, and determining, by using the device management rule, whether the identity feature information of the target user matches identity feature information of a pre-registered user includes: if the verification succeeds, and the quantity of resources that resource transfer is to be performed on satisfies a predetermined verification condition, invoking the local device management rule by using the target application, and determining, by using the device management rule, whether the identity feature information of the target user matches the identity feature information of the pre-registered user.

In the embodiments of this specification, the sending the resource transfer request to a first server corresponding to the target application if the identity feature information of the target user matches the identity feature information of the pre-registered user includes: if the identity feature information of the target user matches the identity feature information of the pre-registered user, verifying the verification information; and if the verification succeeds, sending the resource transfer request to the first server corresponding to the target application.

In the embodiments of this specification, the determining, by using the device management rule, whether the identity feature of the target user matches an identity feature of a pre-registered user includes: obtaining the identity feature information of the target user and device information of a current device, and obtaining identity feature information of a pre-registered user corresponding to the device information from pre-stored device account registration information; and determining, by using the device management rule, whether the identity feature information of the target user matches the identity feature information of the pre-registered user.

In the embodiments of this specification, the determining, by using the device management rule, whether the identity feature information of the target user matches identity feature information of a pre-registered user includes: obtaining the identity feature information of the target user and device information of a current device, obtaining, from device account registration information stored in a second server, first device account registration information that includes the device information, and obtaining identity feature information of a pre-registered user corresponding to the device information from the first device account registration information; and determining, by using the device management rule, whether the identity feature information of the target user matches the identity feature information of the pre-registered user.

In the embodiments of this specification, the device account registration information is information obtained by the second server after performing the following steps: when the second server receives an account registration request that is of a terminal device corresponding to the device information and that is sent by the terminal device, and detects, based on device information comprised in the account registration request, that the terminal device is in an unregistered state, the second server verifies an identity of a registered user of the terminal device based on identity feature information comprised in the account registration request, and performs, based on the identity feature information and the device information, device account registration processing on the terminal device when the verification succeeds.

In the embodiments of this specification, the identity feature information includes one or more of biometric feature information, information about a predetermined document, and a predetermined user key, and the device information includes one or more of a device identifier, a predetermined device key, and device feature information.

In the embodiments of this specification, the biometric feature information includes one or more of facial feature information, fingerprint feature information, palmprint feature information, iris feature information, heart rate feature information, and voiceprint feature information.

In the embodiments of this specification, the following operations are further included: if the identity feature information of the target user does not match the identity feature information of the pre-registered user, sending a notification message indicating an identity verification abnormality to a third server, to trigger the third server to determine whether to continue to perform resource transfer processing corresponding to the resource transfer request; and if a notification message that is sent by the third server and that indicates to perform resource transfer processing corresponding to the resource transfer request is received, sending the resource transfer request to the first server, to trigger the first server to perform resource transfer processing based on the resource transfer request.

In addition, specifically, in the embodiments, the resource transfer device includes a memory and one or more programs. The one or more programs are stored in the memory. The one or more programs can include one or more modules. Each module can include a series of computer-executable instructions for the resource transfer device. One or more processors are configured to execute computer-executable instructions that are included in the one or more programs and that are used to perform the following: obtaining a resource transfer request triggered by a target user by using a target application, where the resource transfer request includes verification information used to perform resource transfer processing and privacy data of the target user, and the privacy data include information used to represent an identity feature of the target user; verifying the verification information by using the target application, and invoking, if the verification succeeds, a local device management rule in the TEE by using the target application, and determining, in the TEE by using the device management rule, whether the privacy data of the target user match privacy data of a pre-registered user; and sending the resource transfer request to a first server corresponding to the target application if the privacy data of the target user match the privacy data of the pre-registered user, to trigger the first server to perform resource transfer processing based on the resource transfer request.

In the embodiments of this specification, the determining, in the TEE by using the device management rule, whether the privacy data of the target user match privacy data of a pre-registered user includes: transmitting the privacy data of the target user and device information of a current device to the TEE, and obtaining, in the TEE, privacy data of a pre-registered user corresponding to the device information from pre-stored device account registration information; and determining, in the TEE by using the device management rule, whether the privacy data of the target user match the privacy data of the pre-registered user.

In the embodiments of this specification, the transmitting the privacy data of the target user and device information of a current device to the TEE includes: performing encryption processing on the privacy data of the target user and the device information of the current device, and transmitting the encrypted privacy data of the target user and the encrypted device information of the current device to the TEE; and the following operations are further included: performing, in the TEE, decryption processing on the encrypted privacy data of the target user and the encrypted device information of the current device to obtain the decrypted privacy data of the target user and the decrypted device information of the current device.

In the embodiments of this specification, the following operations are further included: receiving an update request for target data in the TEE, where the update request includes data to be updated, the data to be updated are ciphertext, and the target data include the device account registration information and/or the device management rule; and transmitting the data to be updated to the TEE, decrypting the data to be updated in the TEE, and updating the target data based on the decrypted data to be updated.

The embodiments of this specification provide a resource transfer device, where a resource transfer request triggered by a target user by using a target application is obtained, where the resource transfer request includes verification information used to perform resource transfer processing and identity feature information of the target user; then, the verification information is verified by using the target application, and if the verification succeeds, a local device management rule is invoked by using the target application, and it is determined, by using the device management rule, whether the identity feature information of the target user matches identity feature information of a pre-registered user; and the resource transfer request is sent to a first server corresponding to the target application if the identity feature information of the target user matches the identity feature information of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Embodiment 8: Further, based on the methods shown in FIG. 1 and FIG. 7, one or more embodiments of this specification further provide a storage medium, configured to store computer-executable instruction information. In specific embodiments, the storage medium can be a USB flash drive, an optical disc, a hard disk, etc. When the computer-executable instruction information stored in the storage medium is executed by a processor, the following process can be implemented: obtaining a resource transfer request triggered by a target user by using a target application, where the resource transfer request includes verification information used to perform resource transfer processing and identity feature information of the target user; verifying the verification information by using the target application, and invoking, if the verification succeeds, a local device management rule by using the target application, and determining, by using the device management rule, whether the identity feature information of the target user matches identity feature information of a pre-registered user; and sending the resource transfer request to a first server corresponding to the target application if the identity feature information of the target user matches the identity feature information of the pre-registered user, to trigger the first server to perform resource transfer processing based on the resource transfer request.

In the embodiments of this specification, the resource transfer request includes a quantity of resources that resource transfer is to be performed on; and the invoking, if the verification succeeds, a local device management rule by using the target application, and determining, by using the device management rule, whether the identity feature information of the target user matches identity feature information of a pre-registered user includes: if the verification succeeds, and the quantity of resources that resource transfer is to be performed on satisfies a predetermined verification condition, invoking the local device management rule by using the target application, and determining, by using the device management rule, whether the identity feature information of the target user matches the identity feature information of the pre-registered user.

In the embodiments of this specification, the sending the resource transfer request to a first server corresponding to the target application if the identity feature information of the target user matches the identity feature information of the pre-registered user includes: if the identity feature information of the target user matches the identity feature information of the pre-registered user, verifying the verification information; and if the verification succeeds, sending the resource transfer request to the first server corresponding to the target application.

In the embodiments of this specification, the determining, by using the device management rule, whether the identity feature of the target user matches an identity feature of a pre-registered user includes: obtaining the identity feature information of the target user and device information of a current device, and obtaining identity feature information of a pre-registered user corresponding to the device information from pre-stored device account registration information; and determining, by using the device management rule, whether the identity feature information of the target user matches the identity feature information of the pre-registered user.

In the embodiments of this specification, the determining, by using the device management rule, whether the identity feature information of the target user matches identity feature information of a pre-registered user includes: obtaining the identity feature information of the target user and device information of a current device, obtaining, from device account registration information stored in a second server, first device account registration information that includes the device information, and obtaining identity feature information of a pre-registered user corresponding to the device information from the first device account registration information; and determining, by using the device management rule, whether the identity feature information of the target user matches the identity feature information of the pre-registered user.

In the embodiments of this specification, the device account registration information is information obtained by the second server after performing the following steps: when the second server receives an account registration request that is of a terminal device corresponding to the device information and that is sent by the terminal device, and detects, based on device information comprised in the account registration request, that the terminal device is in an unregistered state, the second server verifies an identity of a registered user of the terminal device based on identity feature information comprised in the account registration request, and performs, based on the identity feature information and the device information, device account registration processing on the terminal device when the verification succeeds.

In the embodiments of this specification, the identity feature information includes one or more of biometric feature information, information about a predetermined document, and a predetermined user key, and the device information includes one or more of a device identifier, a predetermined device key, and device feature information.

In the embodiments of this specification, the biometric feature information includes one or more of facial feature information, fingerprint feature information, palmprint feature information, iris feature information, heart rate feature information, and voiceprint feature information.

In the embodiments of this specification, the following operations are further included: if the identity feature information of the target user does not match the identity feature information of the pre-registered user, sending a notification message indicating an identity verification abnormality to a third server, to trigger the third server to determine whether to continue to perform resource transfer processing corresponding to the resource transfer request; and if a notification message that is sent by the third server and that indicates to perform resource transfer processing corresponding to the resource transfer request is received, sending the resource transfer request to the first server, to trigger the first server to perform resource transfer processing based on the resource transfer request.

In addition, in other specific embodiments, the storage medium can be a USB flash drive, an optical disc, a hard disk, etc. When computer-executable instruction information stored in the storage medium is executed by a processor, the following process can be implemented: obtaining a resource transfer request triggered by a target user by using a target application, where the resource transfer request includes verification information used to perform resource transfer processing and privacy data of the target user, and the privacy data include information used to represent an identity feature of the target user; verifying the verification information by using the target application, and invoking, if the verification succeeds, a local device management rule in the TEE by using the target application, and determining, in the TEE by using the device management rule, whether the privacy data of the target user match privacy data of a pre-registered user; and sending the resource transfer request to a first server corresponding to the target application if the privacy data of the target user match the privacy data of the pre-registered user, to trigger the first server to perform resource transfer processing based on the resource transfer request.

In the embodiments of this specification, the determining, in the TEE by using the device management rule, whether the privacy data of the target user match privacy data of a pre-registered user includes: transmitting the privacy data of the target user and device information of a current device to the TEE, and obtaining, in the TEE, privacy data of a pre-registered user corresponding to the device information from pre-stored device account registration information; and determining, in the TEE by using the device management rule, whether the privacy data of the target user match the privacy data of the pre-registered user.

In the embodiments of this specification, the transmitting the privacy data of the target user and device information of a current device to the TEE includes: performing encryption processing on the privacy data of the target user and the device information of the current device, and transmitting the encrypted privacy data of the target user and the encrypted device information of the current device to the TEE; and the following operations are further included: performing, in the TEE, decryption processing on the encrypted privacy data of the target user and the encrypted device information of the current device to obtain the decrypted privacy data of the target user and the decrypted device information of the current device.

In the embodiments of this specification, the following operations are further included: receiving an update request for target data in the TEE, where the update request includes data to be updated, the data to be updated are ciphertext, and the target data include the device account registration information and/or the device management rule; and transmitting the data to be updated to the TEE, decrypting the data to be updated in the TEE, and updating the target data based on the decrypted data to be updated.

The embodiments of this specification provide a storage medium, where a resource transfer request triggered by a target user by using a target application is obtained, where the resource transfer request includes verification information used to perform resource transfer processing and identity feature information of the target user; then, the verification information is verified by using the target application, and if the verification succeeds, a local device management rule is invoked by using the target application, and it is determined, by using the device management rule, whether the identity feature information of the target user matches identity feature information of a pre-registered user; and the resource transfer request is sent to a first server corresponding to the target application if the identity feature information of the target user matches the identity feature information of the pre-registered user, to trigger the first server to perform resource transfer processing based on the resource transfer request. As such, in the above-mentioned method, a problem that resources of the target user are stolen when the terminal device of the target user is lost and the verification information (for example, a key (specifically for example, a payment password) for performing resource transfer) for performing resource transfer is also stolen can be alleviated. In addition, privacy information such as the identity feature information of the user is protected, and is not leaked to the target application that triggers resource transfer. Instead, a result of identity feature verification is directly used to perform subsequent resource transfer processing. Therefore, a risk such as theft or stealing of huge data and financial assets of the user can be avoided, and processing such as identity recognition management can be implemented on a trusted device owner of a terminal device.

In addition, a trusted device owner management mechanism added to the terminal device allows to determine, through comparison between identity feature information of a current operation user and identity feature information of a registered user of the terminal device, whether a current operation is the registered user of the terminal device. Therefore, resources (such as financial assets) of the user can be prevented from being maliciously stolen by a relative or a thief. In addition, a processing process of verifying the identity feature information can be implemented at a terminal system layer, and the application does not obtain privacy data related to any identity feature of the user, to protect security of privacy information of the user.

Specific embodiments of this specification are described above. Other embodiments fall within the scope of the appended claims. In some cases, the actions or steps described in the claims can be performed in an order different from that in the embodiments, and the desired results can still be achieved. In addition, processes described in the accompanying drawings do not necessarily need a specific order or a sequential order shown to achieve the desired results. In some implementations, multi-tasking and parallel processing are also possible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

Some embodiments of this specification are described with reference to flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable fraudulent case serial-parallel device to generate a machine such that the instructions executed by the computer or the processor of the another programmable fraudulent case serial-parallel device generate an apparatus for implementing a specific function in one or more processes in the flowcharts and/or in one or more blocks in the block diagrams.

These computer program instructions can be stored in a computer-readable memory that can instruct the computer or the another programmable fraudulent case serial-parallel device to work in a specific way such that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable fraudulent case serial-parallel device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPU), input/output interfaces, network interfaces, and memories.

The memory can include a non-persistent memory, a random access memory (RAM), and/or a non-volatile memory in a computer-readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion so that a process, a method, a product or a device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments where tasks are performed by remote processing devices that are connected through a communication network. In the distributed computing environments, the program module can be located in a local and remote computer storage medium including a storage device.

The embodiments in this specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly.

For related parts, references can be made to related descriptions in the method embodiment.

The above-mentioned descriptions are merely embodiments of this specification, and are not intended to limit this specification. A person skilled in the art can make various changes and variations to this specification. Any modification, equivalent replacement, or improvement made without departing from the spirit and principle of this specification shall fall within the scope of the claims in this specification.

What is claimed is:

1. A computer-implemented method for resource transfer, comprising:

obtaining, by using a target application on a terminal device, a resource transfer request triggered by a target user, wherein the resource transfer request comprises verification information used to perform resource transfer processing and identity feature information of the target user;

verifying, by using the target application, the verification information;

invoking, if the verification succeeds by using the target application, a local device management rule in a trusted execution environment (TEE) of the terminal device;

determining, in the TEE by using the local device management rule, whether the identity feature information of the target user matches identity feature information of a pre-registered user; and if the identity feature information of the target user matches the identity feature information of the pre-registered user, sending the resource transfer request to a first server corresponding to the target application to trigger, based on the resource transfer request, the first server to perform resource transfer processing.

2. The computer-implemented method of claim 1, wherein:

the resource transfer request comprises a quantity of resources that resource transfer is to be performed on; and the invoking, if the verification succeeds by using the target application, a local device management rule in the TEE of the terminal device comprises:

if the verification succeeds, and the quantity of resources that resource transfer is to be performed on satisfies a predetermined verification condition, invoking, by using the target application, the local device management rule in the TEE of the terminal device.

3. The computer-implemented method of claim 1, wherein determining, in the TEE by using the local device management rule, whether the identity feature information of the target user matches identity feature information of a pre-registered user, comprises:

obtaining the identity feature information of the target user and device information of a current device;

obtaining identity feature information of a pre-registered user corresponding to the device information from pre-stored device account registration information; and determining, in the TEE by using the local device management rule, whether the identity feature information of the target user matches the identity feature information of the pre-registered user.

4. The computer-implemented method of claim 1, wherein determining, in the TEE by using the local device management rule, whether the identity feature information of the target user matches identity feature information of a pre-registered user, comprises:

obtaining the identity feature information of the target user and device information of a current device;

obtaining, from device account registration information stored in a second server, first device account registration information that comprises the device information;

obtaining identity feature information of a pre-registered user corresponding to the device information from the first device account registration information; and determining, in the TEE by using the local device management rule, whether the identity feature information of the target user matches the identity feature information of the pre-registered user.

5. The computer-implemented method of claim 4, wherein:

the device account registration information is information obtained by the second server after performing:

when the second server receives an account registration request that is of a terminal device corresponding to the device information and that is sent by the terminal device, and detects, based on device information comprised in the account registration request, that the terminal device is in an unregistered state, the second server:

verifies an identity of a registered user of the terminal device based on identity feature information comprised in the account registration request; and performs, based on the identity feature information and the device information, device account registration processing on the terminal device when the verification succeeds.

6. The computer-implemented method of claim 3, wherein:

the identity feature information comprises one or more of biometric feature information, information about a predetermined document, and a predetermined user key; and the device information comprises one or more of a device identifier, a predetermined device key, and device feature information.

7. The computer-implemented method of claim 6, wherein the biometric feature information comprises one or more of facial feature information, fingerprint feature information, palmprint feature information, iris feature information, heart rate feature information, and voiceprint feature information.

8. The computer-implemented method of claim 1, comprising:

if the identity feature information of the target user does not match the identity feature information of the pre-registered user, sending a notification message indicating an identity verification abnormality to a third server to trigger the third server to determine whether to continue to perform resource transfer processing corresponding to the resource transfer request; and if a notification message that is sent by the third server and that indicates to perform resource transfer processing corresponding to the resource transfer request is received, sending the resource transfer request to the first server to trigger, based on the resource transfer request, the first server to perform resource transfer processing.

9. A non-transitory, computer-readable medium storing one or more instructions executable by a computer system to perform one or more operations for resource transfer, comprising:

obtaining, by using a target application on a terminal device, a resource transfer request triggered by a target user, wherein the resource transfer request comprises verification information used to perform resource transfer processing and identity feature information of the target user;

verifying, by using the target application, the verification information;

invoking, if the verification succeeds by using the target application, a local device management rule in a trusted execution environment (TEE) of the terminal device;

determining, in the TEE by using the local device management rule, whether the identity feature information of the target user matches identity feature information of a pre-registered user; and if the identity feature information of the target user matches the identity feature information of the pre-registered user, sending the resource transfer request to a first server corresponding to the target application to trigger, based on the resource transfer request, the first server to perform resource transfer processing.

10. The non-transitory, computer-readable medium of claim 9, wherein:

the resource transfer request comprises a quantity of resources that resource transfer is to be performed on; and the invoking, if the verification succeeds by using the target application, a local device management rule in the TEE of the terminal device comprises:

if the verification succeeds, and the quantity of resources that resource transfer is to be performed on satisfies a predetermined verification condition, invoking, by using the target application, the local device management rule in the TEE of the terminal device.

11. The non-transitory, computer-readable medium of claim 9, wherein determining, in the TEE by using the local device management rule, whether the identity feature information of the target user matches identity feature information of a pre-registered user, comprises:

obtaining the identity feature information of the target user and device information of a current device;

obtaining identity feature information of a pre-registered user corresponding to the device information from pre-stored device account registration information; and determining, in the TEE by using the local device management rule, whether the identity feature information of the target user matches the identity feature information of the pre-registered user.

12. The non-transitory, computer-readable medium of claim 9, wherein determining, in the TEE by using the local device management rule, whether the identity feature information of the target user matches identity feature information of a pre-registered user, comprises:

obtaining the identity feature information of the target user and device information of a current device;

obtaining, from device account registration information stored in a second server, first device account registration information that comprises the device information;

obtaining identity feature information of a pre-registered user corresponding to the device information from the first device account registration information; and determining, in the TEE by using the local device management rule, whether the identity feature information of the target user matches the identity feature information of the pre-registered user.

13. The non-transitory, computer-readable medium of claim 12, wherein:

the device account registration information is information obtained by the second server after performing:

when the second server receives an account registration request that is of a terminal device corresponding to the device information and that is sent by the terminal device, and detects, based on device information comprised in the account registration request, that the terminal device is in an unregistered state, the second server:

verifies an identity of a registered user of the terminal device based on identity feature information comprised in the account registration request; and performs, based on the identity feature information and the device information, device account registration processing on the terminal device when the verification succeeds.

14. The non-transitory, computer-readable medium of claim 11, wherein:

the identity feature information comprises one or more of biometric feature information, information about a predetermined document, and a predetermined user key; and the device information comprises one or more of a device identifier, a predetermined device key, and device feature information.

15. The non-transitory, computer-readable medium of claim 14, wherein the biometric feature information comprises one or more of facial feature information, fingerprint feature information, palmprint feature information, iris feature information, heart rate feature information, and voiceprint feature information.

16. The non-transitory, computer-readable medium of claim 9, comprising:

if the identity feature information of the target user does not match the identity feature information of the pre-registered user, sending a notification message indicating an identity verification abnormality to a third server to trigger the third server to determine whether to continue to perform resource transfer processing corresponding to the resource transfer request; and if a notification message that is sent by the third server and that indicates to perform resource transfer processing corresponding to the resource transfer request is received, sending the resource transfer request to the first server to trigger, based on the resource transfer request, the first server to perform resource transfer processing.

17. A computer-implemented system for resource transfer, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining, by using a target application on a terminal device of at least one of the one or more computers, a resource transfer request triggered by a target user, wherein the resource transfer request comprises verification information used to perform resource transfer processing and identity feature information of the target user;

verifying, by using the target application, the verification information;

invoking, if the verification succeeds by using the target application, a local device management rule in a trusted execution environment (TEE) of the terminal device;

determining, in the TEE by using the local device management rule, whether the identity feature information of the target user matches identity feature information of a pre-registered user; and if the identity feature information of the target user matches the identity feature information of the pre-registered user, sending the resource transfer request to a first server corresponding to the target application to trigger, based on the resource transfer request, the first server to perform resource transfer processing.

18. The computer-implemented system of claim 17, wherein:

the resource transfer request comprises a quantity of resources that resource transfer is to be performed on; and the invoking, if the verification succeeds by using the target application, a local device management rule in the TEE of the terminal device comprises:

if the verification succeeds, and the quantity of resources that resource transfer is to be performed on satisfies a predetermined verification condition, invoking, by using the target application, the local device management rule in the TEE of the terminal device.

\* \* \* \* \*